R. F. HOFFMAN.
AUTOMATIC GAS REGULATOR.
APPLICATION FILED MAY 16, 1919.

1,358,953.

Patented Nov. 16, 1920.

Witnesses
Frank H Elmes
Paul P. Bieker

Inventor
By Reuben F. Hoffman
Inventor
Attorney

UNITED STATES PATENT OFFICE.

REUBEN FELIX HOFFMAN, OF HAMILTON, OHIO.

AUTOMATIC GAS-REGULATOR.

1,358,953.

Specification of Letters Patent.   Patented Nov. 16, 1920.

Application filed May 16, 1919.  Serial No. 297,710.

*To all whom it may concern:*

Be it known that I, REUBEN FELIX HOFFMAN, a citizen of the United States, residing at Hamilton, in the county of Butler and State of Ohio, have invented certain new and useful Improvements in Automatic Gas-Regulators, of which the following is a specification.

This invention relates to heating systems, and more particularly to the means for regulating the fuel supply whereby a predetermined temperature may be maintained, even though the pressure should materially vary, as frequently happens when the fuel is of a gaseous nature.

The invention is designed for general application, although shown in the accompanying drawings in connection with an incubator, and it is to be understood that in adapting the same to meet specific conditions and requirements, various changes in the form, proportion and minor details of construction and arrangement of the parts may be resorted to within the scope of the invention as claimed, without departing from the nature or spirit of the invention.

Referring to the accompanying drawings which illustrate an embodiment of the invention:—

Corresponding and like parts are referred to in the following description and indicated in the several views of the drawings by like reference characters.

Figure 4:
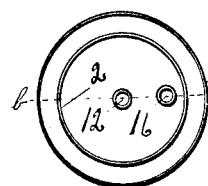
Fig. 4 is a horizontal section on the line A—A of Fig. 2, the parts being shown on the same scale as Figs. 1 and 4.
Figure 3:
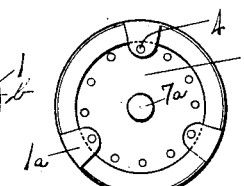
Fig. 3 is a top view of the regulator, the heater being omitted.
Figure 2:
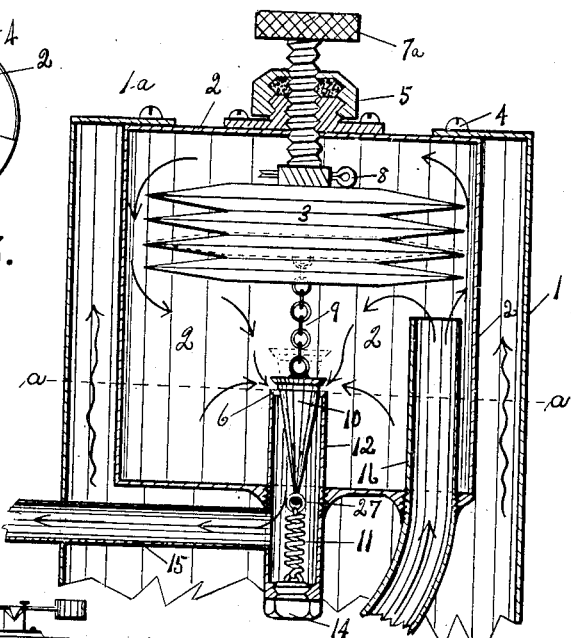
Fig. 2 is a sectional detail of the upper portion of the regulator showing the parts on a larger scale.
Figure 1:
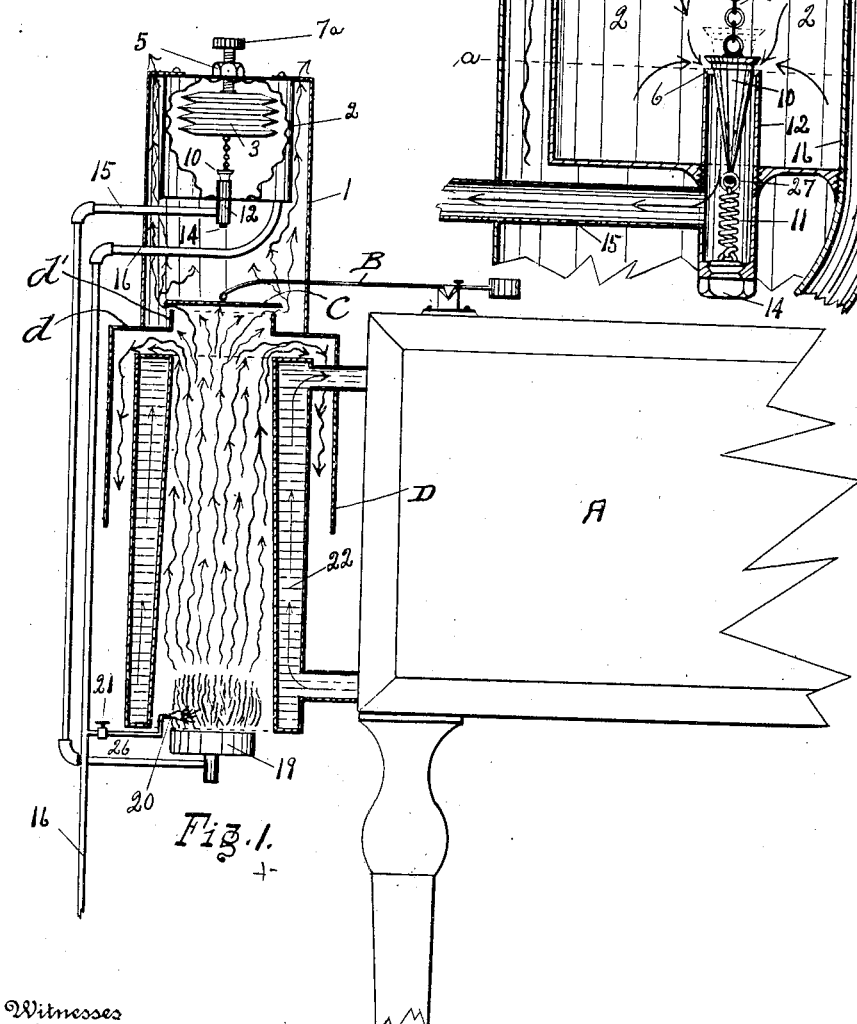
Figure 1 is a vertical, central, sectional view of a regulator constructed in accordance with the invention, and showing the same applied to an incubator, a portion of the latter being illustrated.

The regulator includes a fuel chamber 2, which is closed, and preferably of cylindrical form. A thermostat 3 of any approved type, is disposed within the chamber 2 so as to be affected by the change of temperature. As shown, the thermostat 3 is of the wafer type. A set screw 7ª is threaded into the upper portion of the chamber 2, a close joint being maintained by means of a stuffing box 5. The lower end of the set screw 7ª is connected with the upper portion of the thermostat by means of a pin 8. A valve tube or casing 12, is fitted in the lower portion of the chamber 2, and its lower end is closed by means of a plug 14. A valve 10 closes the upper end of the valve tube or casing 12, and is connected with the lower portion of the thermostat 3 by means of a chain or other suitable connection 9. A contractile helical spring 11 connects the lower end of the valve 10 with the plug 14, and normally exerts a force to hold the valve 10 seated on the upper end of the tube or casing 12. A fuel pipe 16 extends into the chamber 2, and, as shown most clearly in Fig. 2, the upper portion of the fuel pipe 16 is connected with the bottom of the chamber 2 and projects a short distance into the latter. The fuel pipe 16 may connect with any suitable source of gas supply. A drum 1 incloses the chamber 2 and is spaced therefrom. Lugs 1ª extending inwardly from the upper end of the drum 1, overlap the chamber 2 and are secured thereto by suitable fastenings, such as screws 4. The drum 1 is spaced from the chamber 2, so as to provide a uniform passage for the escape of the hot air which envelops the fuel chamber 2 when the regulator is in active operation.

A heater 22 is disposed below the fuel chamber 2, or may be conveniently positioned so as to deliver the waste heat to the drum 1, whereby the change in temperature may affect the thermostat which, in turn, regulates the seating of the valve 10. The heater 22 illustrated, is of the boiler type and comprises concentric shells between which is formed the water space. The inner shell of the heater is open throughout its length. The upper and lower ends of the heater 22 are connected with the water space of an incubator A or other device or structure to be heated. A shell D envelops the upper portion of the heater 22. A flange $d$ extends inwardly from the upper end of the shell D and terminates in an upwardly extending collar $d'$, which is in line with the inner shell of the heater. A valve C coöperates with the collar $d'$ so as to regulate the escape of the hot air passing through the inner shell of the heater. A lever B has the valve C attached to one end thereof, said lever being counterbalanced so as to facilitate the action of the valve C.

A burner 19 is disposed at the lower end of the heater 22 and in line with the inner shell thereof. A pipe 15 connects the burner 19 with the valve tube or casing 12. A tube 26 connects with the pipe 16 and terminates in a pilot burner which is disposed contiguous to the main burner 19. A valve 21 in the length of the tube 16, provides means for controlling the pilot light.

In practice, the fuel or gas from a suitable source of supply is fed to the chamber 2 by means of the pipe 16. The fuel from the chamber 2 passes through the valve tube or casing 12 into the pipe 15, thence to the burner 19, where it is consumed. The heat generated by the flame passes upwardly through the inner shell of the heater 22 into the upper portion of the shell D, thence downwardly, and escapes through the collar $d'$ into the drum 1, and passing around the gas chamber, heats the same and causes the thermostat 3 to operate so as to unseat the valve 10 to a greater or less extent. The position of the thermostat and valve 10 may be regulated by a proper adjustment of the set screw $7^a$. It will thus be understood that, so long as the temperature within the gas chamber 2 remains approximately uniform, the valve 10 will be unseated to a given extent, and thereby permit a uniform supply of gas to the burner 19. Any variation in the flame of the gas at the burner 19 will cause a variation in the hot air passing through the inner shell of the heater 22, and since a portion of this hot air passes around the gas chamber 2, the latter will be affected so as to cause the thermostat to regulate the seating of the valve 10. In the event of the heat increasing, the temperature within the gas chamber will correspondingly rise and cause a greater expansion of the thermostat, with the result that the valve 10 will move nearer to its seat and thereby shut off a proportionate supply of gas to the burner 19. As a result, the flame will be diminished and the heat decreased. Should the flame at the burner 19 decrease, the temperature within the fuel chamber 2 will proportionately decrease and thereby admit of the thermostat contracting, with the result that the valve 10 will unseat to a greater extent and thereby permit a greater supply of gas passing from the chamber 2 to the burner 19. It will thus be understood that variation in the flame at the burner 19 produces a variation in the temperature of the gas chamber since the latter is located in the path of the hot air escaping from the burner, and, as a result, the supply of fuel to the burner is regulated to maintain the temperature approximately uniform.

What I claim is:

1. In a regulator of the character specified, a fuel chamber disposed in the path of a medium to be affected by the changes of temperature, means for supplying fuel to the chamber, a burner, means for supplying fuel to the burner from the chamber and including a valve, and a thermostat within the chamber adapted to be affected by the changes of temperature and connected with the valve to unseat the same more or less to regulate the supply of fuel to the burner.

2. A regulator of the character specified, comprising a fuel chamber, means for supplying fuel thereto, a burner disposed to deliver heat therefrom to the fuel chamber, means for supplying fuel from the chamber to the burner and including a valve, a thermostat within the fuel chamber and connected with the valve, and means for varying the position of the thermostat to admit of initial adjustment of the said valve.

3. A regulator of the character specified, including a fuel chamber, a thermostat adjustable within the fuel chamber, means for supplying fuel to the chamber, a burner, a pipe connecting the fuel chamber with the burner, and a valve connected with the thermostat and adapted to control the delivery of fuel from the chamber to the fuel pipe coöperating with the burner.

4. In a regulator of the character specified, a fuel chamber, a drum enveloping the fuel chamber and spaced therefrom, a burner, means for directing the heat of the burner to the said drum, means for supplying fuel to the chamber, a pipe connecting the fuel chamber with the burner, and a valve for controlling the delivery of fuel from the chamber to the pipe and connected with the thermostat to be regulated thereby.

5. In a regulator of the character set forth, a fuel chamber, a thermostat adjustable within the fuel chamber, a drum enveloping the fuel chamber and spaced therefrom, a shell associated with the drum, a burner disposed to deliver the heat therefrom to the shell, a valve for regulating the supply of heat from the shell to the drum, a fuel pipe having connection with the fuel chamber, a pipe connecting the fuel chamber with the burner for supplying fuel to the latter, and a valve for controlling the supply of gas to the pipe having connection with the burner and connected with the thermostat to be actuated thereby.

In testimony whereof I affix my signature in the presence of two witnesses.

REUBEN FELIX HOFFMAN.

Witnesses:
  MARY A. CONLON,
  JNO. D. ANDREWS.